United States Patent [19]
Hoffsommer et al.

[11] 3,860,616
[45] Jan. 14, 1975

[54] SYNTHESIS OF D,1-ZEARALANOL

[75] Inventors: Robert D. Hoffsommer; David Taub, both of Metuchen, N.J.

[73] Assignee: Merck & Co., Inc., Rahway, N.J.

[22] Filed: Nov. 29, 1972

[21] Appl. No.: 310,282

Related U.S. Application Data

[62] Division of Ser. No. 821,139, May 1, 1969, abandoned.

[52] U.S. Cl. ........ 260/343.2 F, 424/279, 260/521 R
[51] Int. Cl. ................................................ C07d 9/00
[58] Field of Search .............................. 260/343.2 F

[56] References Cited
UNITED STATES PATENTS

| | | | |
|---|---|---|---|
| 3,239,345 | 3/1966 | Hodge et al. | 260/343.2 X |
| 3,373,037 | 3/1968 | Abbott | 260/343.2 X |
| 3,551,455 | 12/1970 | Girotra et al. | 260/343.2 |
| 3,562,313 | 2/1971 | Cross et al. | 260/343.2 X |

*Primary Examiner*—John M. Ford
*Attorney, Agent, or Firm*—Hesna Pfeiffer; J. Jerome Behan

[57] ABSTRACT

The preparation of d,1-zearalanol and mono- and diethers thereof, compounds exhibiting anabolic, estrogenic and fertility control properties, are prepared from readily available chemical intermediates. Catalytic reduction of the aliphatic double bond and the carbonyl moiety of 2-(10'-hydroxy-6'-oxo-1'-trans undecenyl)-4,6-dimethoxy benzoic acid affords a tetrahydro seco acid which is ring closed with trifluoroacetic anhdyride to yield d,1-zearalanol-2,4-dimethylether; cleavage of the diether is accomplished with boron tribromide to produce d,1-zearalanol. Alternatively, catalytic reduction of the aliphatic double bond of 2-(10'-hydroxy-6'-oxo-1'-trans undecenyl)-4,6-dimethoxy benzoic acid produces a dihydro seco acid which is ring closed with trifluoroacetic anhydride to yield d,1-zearalanone-2,4-dimethyl ether; reduction of the carbonyl function affords d,1-zearalanol-2,4-dimethyl ether which is reacted with boron tribromide to produce d,1-zearalanol.

3 Claims, No Drawings

SYNTHESIS OF D,1-ZEARALANOL

This is a division of application Ser. No. 821,139, filed May 1, 1969, now abandoned.

This invention relates to the novel compound d,1-zearalanol. More specifically it relates to the preparation of d,1-zearalanol by a chemical synthesis from readily available organic compounds.

The optically active form of 6-(6',10'-dihydroxyundecanyl)-β-resorcylic acid-μ-lactone, a potent anabolic agent useful in the raising of meat producing animals, has been prepared by fermenting the microorganism, *Gibberella Zeae* (Gordon), and reducing the olefinic bond and ketone moiety of the product zearalenone as described in U.S. Pat. No. 3,239,345; the substance is known as zearalanol and has the structural formula:

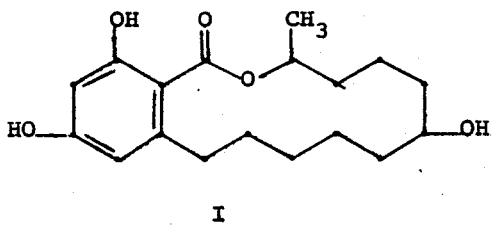

I

Heretofore the only product obtainable has been the optically active material prepared by reduction of the fermentation product zearalenone. It is the purpose of this invention to provide a chemical synthesis of d,1-zearalanol and certain of its mono- and di-ethers. The products of the invention are valuable compounds possessing anabolic and estrogenic activity as well as the fertility control properties of the optically active zearalanol produced by fermentation.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth, and the like.

The compounds of the present invention can be produced from known substances. The starting material in the process for preparing racemic d,1 zearalanol is the compound 2-(10'-hydroxy-6'-oxo-1'-trans undecenyl) 4,6-diloweralkoxy benzoic acid having the structural formula:

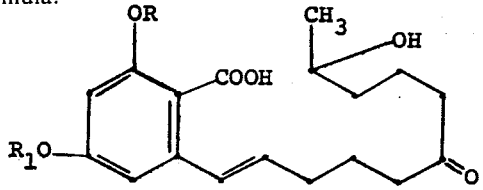

II where R and $R_1$ is hydrogen or lower alkyl. The preparation of this compound is described in Taub, et al, CHEMICAL COMMUNICATIONS, 1967, page 225. In accordance with the process of this invention, reduction of the olefinic bond and the ketone group of the seco acid of Formula II by addition of four hydrogen atoms is accomplished by hydrogenation in the presence of a Raney nickel catalyst. The compound produced upon reduction of both the olefinic bond and the ketone group is referred to as the tetrahydro seco acid or 2-(6',10'-dihydroxy undecanyl)-4,6-diloweralkoxy benzoic acid having the structural formula:

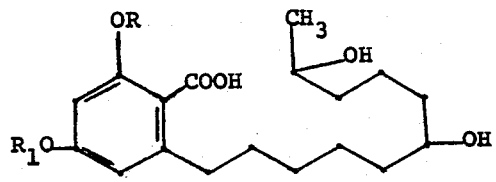

III wherein R and $R_1$ are lower alkyl.

The reduction step is preferably carried out with the seco acid of Formula II dissolved or suspended in a suitable solvent, e.g. an alcohol, preferably a lower alkanol such as methanol, ethanol, or propanol. In general, the reduction can be accomplished at ambient temperatures and ambient pressures. Preferably, temperatures are from about 15°C. to 40°C., and preferable pressures are from about 1 to 100 atmospheres. In general, from about 0.1 to 5 grams of catalyst are used per gram of seco acid.

In accordance with the next step of our invention, the diether of d,1-zearalanol is prepared by treating the tetrahydro seco acid of Formula III with a ring closing agent such as trifluoroacetic anhydride. The ring closure is brought about in the cold in a suitable solvent such as benzene, toluene, or xylene. The tetrahydro seco acid cyclizes to give the d,1-zearalanol diether IV:

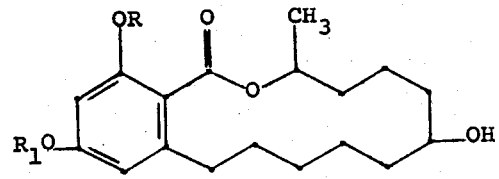

IV wherein R and $R_1$ represent lower alkyl groups.

The final step in the synthesis of d,1-zearalanol is accomplished by cleaving the diether (IV) with boron tribromide or, alternatively, with pyridine hydrochloride. The boron tribromide reaction is a rapid one, and the ether cleavage is substantially complete in a matter of minutes at temperatures of from about −10°C. to about +15°C. Removal of the solvent affords crude product which may be purified either directly by crystallization from a solvent such as nitromethane, or by chromatography on an absorbent such as silica gel, followed by crystallization from a suitable organic solvent, such as nitromethane.

The invention also provides a method for synthesizing the 4-monoethers of d,1-zearalanol by selective cleavage of the diether. This is effected with boron trichloride. The monoether is isolated and purified in essentially the same way as described above for purifying d,1-zearalanol itself.

d,1-Zearalanol can also be prepared by an alternate route employing essentially the same reactions as disclosed above. The olefinic bond of the seco acid II can be reduced by hydrogenation to afford the dihydro seco acid, 2-(10'-hydroxy-6'-oxo-undecanyl)-4,6- diloweralkoxy benzoic acid (V), having the structural formula:

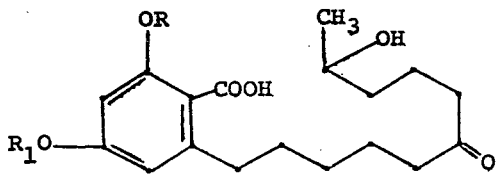

V wherein R and R₁ are lower alkyl. This hydrogenation is carried out in the presence of a palladium catalyst on a suitable carrier, e.g. charcoal. Generally, the catalyst contains from about 0.01 to about 10% of the catalytic metal. The catalyst is used in a ratio of generally from 0.02 to 2 grams of catalyst, preferably about 0.1 to 0.5 gram per gram of 2-(10'-hydroxy-6'-oxo-undecenyl)-2,4-diloweralkoxy benzoic acid (II). The reduction may be carried out while the seco acid (II) is dissolved in a suitable solvent, e.g. ethyl acetate. The reaction is run at ambient temperatures; e.g. from about 15°C. to 40°C., and ambient pressures, since only the presence of hydrogen is required; however, it is preferred to utilize an elevated pressure, e.g. from about 1 to 50 atmospheres of hydrogen.

Ring closure of the dihydro seco acid (V) with trifluoroacetic anhydride produces d,l-zearalanone-2,4-diether VI having the structural formula:

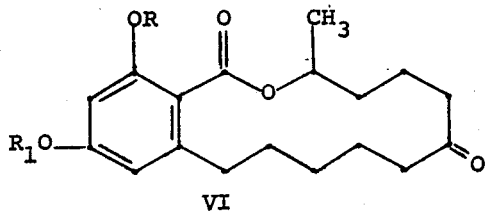

VI wherein R and R₁ are lower alkyl.

The ring closure reaction is carried out using the same conditions and solvents, e.g. 0°C. to 20°C. in an aromatic hydrocarbon solvent, as the ring closure of the tetrahydro seco acid (III).

Reduction of the ketone group of d,l-zearalanone diether (VI) is accomplished by running the hydrogenation in the presence of Raney nickel to produce d,l-zearalanol diether (IV). This reduction is preferably carried out with the zearalanone compound of Formula VI dissolved or suspended in a suitable solvent, e.g. an alcohol, preferably a lower alkanol such as methanol, ethanol, or propanol. In general, the reduction can be accomplished at ambient temperatures and pressures. Preferably, temperatures are from about 15°C. to 40°C., and preferable pressures are from about 1 to 100 atmospheres. In general, from about 0.1 to 5 grams of catalyst are used per gram of zearalanone compound.

As previously indicated, d,l-zearalanol and the ether derivatives thereof, have growth promoting activity in animals as well as estrogenic and uterotrophic activity.

The best mode contemplated by applicants for carrying out their invention is more fully illustrated in the following examples. It is to be understood that no limitation is implied or intended except as set forth in the appended claims.

EXAMPLE 1

2-(6',10',-Dihydroxy-Undecanyl)-4,6-Dimethoxy Benzoic Acid (III)

500 Mg., 1.37 millimoles, of 2-(10'-hydroxy-6'-oxo-1'-trans-undecenyl)-4,6-dimethoxy benzoic acid (II) is dissolved in 10 ml. of ethanol in a 50 ml. hydrogenation bottle. 500 Mg. of Raney nickel as a thick aqueous suspension is added and hydrogenation is carried out in a Parr apparatus at 25°C. and 50 psi for 8 hours. The reaction mixture is filtered to remove the catalyst, the flask and filter pad are washed with additional ethanol, and the combined filtrate and washings are concentrated in vacuo to dryness to yield 2-(6',10'-dihydroxy-undecanyl)-4,5-dimethoxy benzoic acid (III). This compound is used in subsequent steps without further purification. The nmr spectrum in deuterochloroform shows the two aromatic protons as a single peak at 6.38 ppm; the presence of three active hydrogens (deuterium exchange); the 4-methoxyl group at 3.86 ppm (3 H singlet); the 6-methoxyl group at 3.82 ppm (3 H singlet); and the terminal methyl protons at 1.18 ppm (3 H doublet, J = 6.2).

EXAMPLE 2 d,l-Zearalanol-2,4-Dimethyl Ether (IV)

To a stirred slurry of 400 mg. of 2-(6',10'-dihydroxy-undecanyl)-4,6-dimethoxy benzoic acid (III) in 135 ml. of benzene at 10°C. is added 295 mg. (0.20 ml.) trifluoroacetic anhydride. The reaction mixture becomes homogeneous within 15 minutes; it is kept at 10°–15°C. for 3 hours and at 0°C. for 18 hours. The mixture is washed with dilute aqueous potassium hydroxide solution, saturated salt solution, and dried over magnesium sulfate and concentrated to dryness under vaccum to give 90 mg. of neutral product containing d,l-zearalanol-2,4-dimethyl ether. The alkaline extract is acidified with dilute hydrochloric acid, extracted with chloroform, and the latter extract washed with saturated salt solution, dried over magnesium sulfate and concentrated to dryness under vacuum to give 240 mg. of 2-(6',10'-dihydroxy-undecanyl)-4,5-dimethoxy benzoic acid which may be recycled.

The neutral product in 3 ml. of methanol is treated with 1 ml. of 5 percent aqueous sodium hydroxide to saponify any trifluoroacetate ester groupings present. After 2 hours at 20°C., water is added and the mixture is extracted with chloroform. The latter extract is washed with saturated salt solution and concentrated to dryness to give 85 mg. of an amorphous residue containing d,l-zearalanol-2,4-dimethyl ether as indicated by thin layer chromatographic comparison with optically active zearalanol dimethyl ether. The respective I.R. spectra in chloroform are essentially identical: OH at 2.85, 2.9–3.05μ lactone carbonyl at 5.85μ.

EXAMPLE 3 d,l-Zearalanol (I)

A. To a stirred solution of 120 mg. of d,l-zearalanol dimethyl ether in 1.2 ml. of methylene chloride under nitrogen at 0°C. there is added a cooled (0°C.) solution of 0.5 ml. of boron tribromide in 0.8 ml. of methylene chloride. The cooling bath is removed and after 5 minutes the reaction mixture is concentrated to dryness under vacuo. The product is purified by preparative thin layer chormatography on silica gel G coated glass plates, using chloroform —5 percent acetonitrile as the developing solvent. The product is removed from the glass plates, dissolved in a minimum amount of acetone, and hexane added to the acetone solution until crystallization begins. The crystalline product is filtered off and dried to give d,1-zearalanol.

B. A mixture of 500 mg. of d,1-zearalanol dimethyl ether and 5.0 g. of pyridine hydrochloride is held under nitrogen for 1 hour at 180°–185°C. The mixture is then cooled, dilute aqueous hydrochloric acid added to it, and the mixture extracted twice with 10 ml. of methylene chloride. The methylene chloride extracts are combined, washed with saturated aqueous sodium chloride, dried over sodium sulfate and concentrated in vacuo to dryness. The residue is purified by thin layer chromatography and crystallization from acetonehexane according to the procedure set forth in part A above to afford d,1-zearalanol (I).

EXAMPLE 4 d,1-Zearalanol-4-Monomethyl Ether (IV)

To a stirred solution of 480 mg. of d,1-zearalanol dimethyl ether in 5 ml. of methylene chloride under nitrogen at 0°C. there is added a cooled (0°C.) solution of 2 ml. of boron trichloride in 2 ml. of methylene chloride. The reaction mixture is poured onto 50 ml. of crushed ice with stirring. The mixture is made basic with potassium bicarbonate and extracted with methylene chloride. The latter extract is washed with saturated aqueous sodium chloride, dried over magnesium sulfate and taken to dryness under vacuum. The monomethyl ether is isolated and purified by preparative thin layer chromatography (as described in Example 3) to afford substantially pure material.

EXAMPLE 5

2-(10'-hydroxy-6'-oxo-undecanyl)-4,6-dimethoxy benzoic acid (V)

A solution of 728 mg. (2.00 millimoles) of 2-(10'-hydroxy-6-oxo-1-trans-undecenyl)-4,6-dimethoxy benzoic acid (II) in 20 ml. of ethyl acetate is hydrogenated at atmospheric pressure and 25°C. over 300 mg. of 5% Palladium on charcoal catalyst. Following uptake of 2 millimoles of hydrogen, the catalyst is removed by filtration and washed with ethyl acetate. The combined filtrate and washings are concentrated to dryness under reduced pressure to give 2-(10'-hydroxy-6'-oxo-undecanyl)-4,6-dimethoxy benzoic acid (V); I.R. spectra in chloroform 2.8–3.3μ (acid and hydroxyl —OH); 5.82–5.85μ (acid and ketone C = O).

EXAMPLE 6 d,1-Zearalanone-2,4-Dimethyl Ether (VI)

To a stirred slurry of 400 mg. of 2-(10'-hydroxy-6'-oxo-undecanyl)-4,6-dimethoxy benzoic acid (V) in 135 ml. of benzene at 10°C. is added 295 mg. (0.20 ml.) trifluoroacetic anhydride. After the reaction mixture becomes homogeneous, it is kept at 10°–15°C. for 3 hours and at 0°C. for 18 hours. The mixture is washed with dilute aqueous potassium hydroxide solution, then with a saturated salt solution, and dried over magnesium sulfate and concentrated to dryness under vacuum to give a neutral product containing d,1-zearalanone-2,4-dimethyl ether.

The neutral product in 3 ml. of methanol is treated with 1 ml. of 5 percent aqueous sodium hydroxide to saponify any trifluoroacetate ester groupings present. After 2 hours at 20°C., water is added and the mixture is extracted with chloroform. The latter extract is washed with saturated salt solution and concentrated to dryness to give an amorphous residue containing d,1-zearalanone-2,4-dimethyl ether. The I.R. spectra of this compound in chloroform showed bonds at 5.80μ (lactone carbonyl), 5.85μ (ketone carbonyl).

EXAMPLE 7 d,1-Zearalanol-2,4-dimethyl ether

A solution of 500 mg. (1.43 millimoles) of d,1-zearalanone-2,4-dimethyl ether (VI) in 10 ml. of ethanol is hydrogenated at 25°C. and 50 psi over 500 mg. of Raney nickel catalyst. Following the uptake of 1.43 millimoles of hydrogen, the catalyst is removed by filtration and washed with ethanol. The combined filtrate and washings are concentrated to dryness under reduced pressure to yield d,1-zearalanol-2,4-dimethyl ether (IV).

The subject matter which applicants regard as their invention is particularly pointed out and distinctly claimed as follows.

What is claimed is:

1. The process for preparing the compound having the formula:

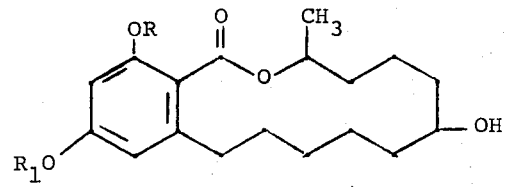

wherein R is loweralkyl and $R_1$ is loweralkyl, that comprises treating the compound:

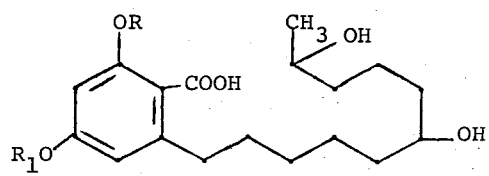

wherein R and $R_1$ are as defined above, with trifluoroacetic anhydride.

2. The process of claim 1 wherein R is methyl and $R_1$ is methyl.

3. The process of claim 2 in which the temperature is between from about 0°C. to about 15°C.

* * * * *